BEST AVAILABLE COPY
BEST AVAILABLE COPY
B. S. ROBERTS.
Breech-Loading Fire-Arm.
No. 2,068. Reissued Sept. 5, 1865.
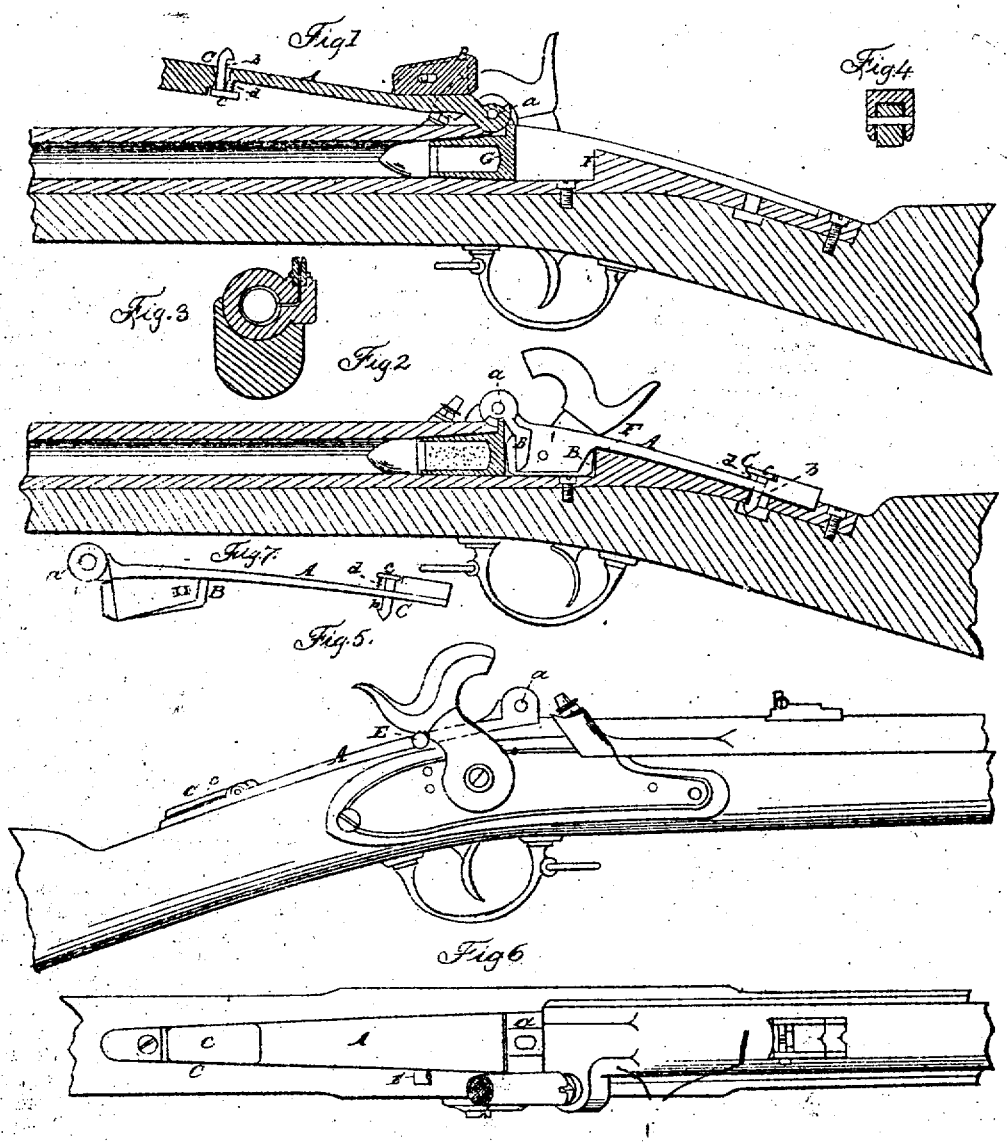
Witnesses
R. T. Campbell
Chas. Schaefer
Inventor
B. S. Roberts
Aug. Mueller Atty.

BEST AVAILABLE COPY

UNITED STATES PATENT OFFICE.

BENJAMIN S. ROBERTS, OF THE UNITED STATES ARMY.

IMPROVEMENT IN BREECH-LOADING FIRE-ARMS.

Specification forming part of Letters Patent No. 36,531, dated September 23, 1862; Reissue No. 2,068, dated September 5, 1865.

DIVISION 2.

*To all whom it may concern:*

Be it known that I, BENJAMIN S. ROBERTS, of the United States Army, have invented a new and useful Improvement in Breech-Loading Fire-Arms; and I do hereby declare that the following is a full, clear, and exact description of the same, reference being had to the accompanying drawings, forming part of this specification, in which—

Figure 1 is a vertical longitudinal section of a fire-arm as it appears when the metallic cartridge is ready to be driven home. Fig. 2 is a like section as the gun appears after the cartridge is driven home. Fig. 3 is a cross-section showing the communication from the nipple to the charge. Fig. 4 is a cross-section of the movable breech-block. Fig. 5 is a side elevation of the fire-arm as it appears in Fig. 2. Fig. 6 is a top view of the same as it appears when the hammer is down upon the nipple. Fig. 7 is a side view of the breech-piece detached from the gun.

The same letters of reference in the several figures indicate corresponding parts.

My invention relates to an improvement in that class of fire-arm which employs a swinging or jointed breech-piece hinged above the line of bore, and so constructed as to swing upward and forward in opening the breech, after a discharge, and backward and downward after inserting a charge.

The nature of my invention under this patent consists, first, in the adaptation of arms of the above-named character to the use of metallic cartridges, in combination with a hammer, a projection from the breech-piece, and a lock of the breech-piece, when these three elements are so constructed and arranged as to prevent the gun from being fired in the usual way until the breech-piece is locked against its upward tendency caused by the pressure of the gas during the discharge of the gun.

It consists, second, in the combination, in an arm of the character substantially as described, of a hammer, a projection from the breech-piece, and a lock of the breech-piece, as will be hereinafter described.

To enable others skilled in the art to make and use my invention, I will proceed to describe one mode of constructing the same, with reference to the drawings.

A B designate the breech-piece. It is hinged to the breech end of the barrel above the line of bore, as indicated by the letter *a*, so as to swing upward and forward.

On the rear end of the part A of the breech-piece a lock, C, is constructed, substantially as represented. The lock shown consists of a pivoted hook-shaped piece, *b*, with a finger-plate, *c*, on its upper end. A spring, *d*, holds this lock against accidental movement when the breech-piece is in proper position for supporting a metallic cartridge against the pressure of the gas when the arm is fired. The office of the lock is to prevent an upward movement of the breech-piece when the arm is fired; and as this office may be performed by a different style of lock, and by one located in any position in rear of the hinge, I do not confine myself to the precise construction and arrangement shown.

In the drawings the breech-block B is shown as slotted and capable of sliding; but this construction is not essential so long as the construction of the depression D of the stock, in which it fits or has its seat, will admit of its ready withdrawal in an upward and forward direction, and also of its ready replacement by a backward and downward movement. The object sought (and attained) is to just have the breech-block fill the space which exists by reason of the depression D between the recoil shoulder F and the rear end of the metallic cartridge G. There should be no play whatever of the breech-piece when the charge of a metallic cartridge is exploded.

With those breech-loading fire-arms which are only adapted for using loose ammunition or paper cartridges, instead of metallic cartridges, it is essential to have a slight independent movement of the part B of the breech-piece, in order to force the gas-check into the breech, so as to make a tight joint between the gas-check and barrel. It was on this account that I represented the separate piece B, and made the same with a slot. I have now concluded for the present or under this patent to drop so much of my invention as relates to loose ammunition, and to confine it to the use of metallic cartridges. This being the case, it is evident that a breech-piece which swings downward and backward, substantially as shown, made of a single piece of metal, will perform the office due to it—viz., prevent any displacement of the metallic cartridge when an explosion of the charge takes place.

In the use of arms of the character described and represented, it is important, in order to insure safety while firing a charge, to combine the hammer with the breech-piece in such a manner that the charge cannot possibly be exploded until the breech-piece is locked down in rear of the cartridge. To this end I have formed a projection, E, on that side of the breech-piece which is next to the hammer, as represented, or in any other substantially similar manner. In the drawings the projection is represented as being in rear of the hammer; but I do not confine myself to this location so long as the combination and mode of operation herein specified are not departed from by locating it otherwise. With the arrangement shown, when the hammer is thrown back, it necessarily comes in contact with the projection in the event of the breech-piece not being locked down in its seat, and cannot be fully cocked until the breech-piece has been caused to fully seat itself and is locked securely, as illustrated in Fig. 5 of the drawings.

The invention I have herein described enables me to make a very superior breech-loading arm out of the old musket used in the service at a very slight cost.

What I claim as my invention, and desire to secure by Letters Patent, is—

The adaptation of arms, such as described, to the use of metallic cartridges, in combination with a hammer, a projection from the breech-piece, and a lock of the breech-piece, when these three elements are so constructed and arranged as to prevent the arm from being fired in the usual way until the breech-piece is locked against its upward tendency caused by the pressure of the gas during a discharge of the arm, substantially as described.

B. S. ROBERTS.

Witnesses:
R. T. CAMPBE
A. MOORE.